United States Patent
Kumaresan et al.

(10) Patent No.: US 9,559,348 B2
(45) Date of Patent: Jan. 31, 2017

(54) CONDUCTIVITY CONTROL IN ELECTROCHEMICAL CELLS

(71) Applicant: Sion Power Corporation, Tucson, AZ (US)

(72) Inventors: Karthikeyan Kumaresan, Tucson, AZ (US); Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 343 days.

(21) Appl. No.: 14/150,156

(22) Filed: Jan. 8, 2014

(65) Prior Publication Data

US 2014/0193723 A1    Jul. 10, 2014

Related U.S. Application Data

(60) Provisional application No. 61/750,139, filed on Jan. 8, 2013.

(51) Int. Cl.
| | |
|---|---|
| *H01M 4/80* | (2006.01) |
| *H01M 4/13* | (2010.01) |
| *H01M 4/58* | (2010.01) |
| *H01M 4/02* | (2006.01) |
| *H01M 4/66* | (2006.01) |
| *H01M 10/052* | (2010.01) |
| *H01M 12/06* | (2006.01) |
| *H01M 12/08* | (2006.01) |

(52) U.S. Cl.
CPC .............. *H01M 4/02* (2013.01); *H01M 4/66* (2013.01); *H01M 10/052* (2013.01); *H01M 12/06* (2013.01); *H01M 12/08* (2013.01); *H01M 2004/021* (2013.01); *Y02E 60/122* (2013.01)

(58) Field of Classification Search
USPC .................................................. 429/236, 237
IPC ............. H01M 4/8605,4/8626, 4/00, 2004/021, 4/42, 4/405
See application file for complete search history.

(56) References Cited

U.S. PATENT DOCUMENTS

| | | | |
|---|---|---|---|
| 4,664,991 A | 5/1987 | Perichaud et al. |
| 4,739,018 A | 4/1988 | Armand et al. |
| 4,833,048 A | 5/1989 | Dejonghe et al. |
| 4,917,974 A | 4/1990 | De Jonghe et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |

(Continued)

FOREIGN PATENT DOCUMENTS

| | | |
|---|---|---|
| EP | 0875951 A1 | 11/1998 |
| JP | 2008-166143 A | 7/2008 |
| JP | 2011-159568 A | 8/2011 |
| WO | WO 99/33125 A1 | 7/1999 |
| WO | WO 99/33130 A1 | 7/1999 |

(Continued)

OTHER PUBLICATIONS

International Search Report and Written Opinion dated Jun. 9, 2014 for PCT/US2014/010680.

(Continued)

*Primary Examiner* — Patrick Ryan
*Assistant Examiner* — Julian Anthony
(74) *Attorney, Agent, or Firm* — Wolf, Greenfield & Sacks, P.C.

(57) ABSTRACT

Electrochemical cells having desirable electronic and ionic conductivities, and associated systems and methods, are generally described.

21 Claims, 5 Drawing Sheets

(56) References Cited

U.S. PATENT DOCUMENTS

| | | | |
|---|---|---|---|
| 5,516,598 | A | 5/1996 | Visco et al. |
| 5,529,860 | A | 6/1996 | Skotheim et al. |
| 5,538,812 | A | 7/1996 | Lee et al. |
| 5,601,947 | A | 2/1997 | Skotheim et al. |
| 5,648,187 | A | 7/1997 | Skotheim |
| 5,690,702 | A | 11/1997 | Skotheim et al. |
| 5,723,230 | A | 3/1998 | Naoi et al. |
| 5,783,330 | A | 7/1998 | Naoi et al. |
| 5,792,575 | A | 8/1998 | Naoi et al. |
| 5,882,819 | A | 3/1999 | Naoi et al. |
| 5,919,587 | A | 7/1999 | Mukherjee et al. |
| 5,961,672 | A | 10/1999 | Skotheim et al. |
| 6,114,068 | A * | 9/2000 | Yamada .............. H01G 9/155 252/62.2 |
| 6,117,590 | A | 9/2000 | Skotheim et al. |
| 6,153,337 | A | 11/2000 | Carlson et al. |
| 6,201,100 | B1 | 3/2001 | Gorkovenko et al. |
| 6,306,545 | B1 | 10/2001 | Carlson et al. |
| 7,247,408 | B2 | 7/2007 | Skotheim et al. |
| 2002/0106561 | A1* | 8/2002 | Lee ...................... H01M 4/602 429/218.1 |
| 2003/0082436 | A1 | 5/2003 | Hong et al. |
| 2003/0165731 | A1 | 9/2003 | Vyas et al. |
| 2006/0073386 | A1 | 4/2006 | Pope et al. |
| 2006/0115579 | A1 | 6/2006 | Mukherjee et al. |
| 2006/0238203 | A1 | 10/2006 | Kelley et al. |
| 2007/0221265 | A1 | 9/2007 | Affinito et al. |
| 2007/0224502 | A1 | 9/2007 | Affinito et al. |
| 2008/0187663 | A1 | 8/2008 | Affinito |
| 2008/0318128 | A1 | 12/2008 | Simoneau et al. |
| 2009/0185327 | A1 | 7/2009 | Seymour |
| 2009/0200986 | A1 | 8/2009 | Kopera |
| 2009/0311604 | A1 | 12/2009 | Nazar et al. |
| 2010/0035128 | A1 | 2/2010 | Scordilis-Kelley et al. |
| 2010/0062341 | A1 | 3/2010 | Hambitzer |
| 2010/0129699 | A1 | 5/2010 | Mikhaylik et al. |
| 2010/0239914 | A1 | 9/2010 | Mikhaylik et al. |
| 2010/0294049 | A1 | 11/2010 | Kelley et al. |
| 2011/0059361 | A1 | 3/2011 | Wilkening et al. |
| 2011/0068001 | A1 | 3/2011 | Affinito et al. |
| 2011/0070491 | A1 | 3/2011 | Campbell et al. |
| 2011/0070494 | A1 | 3/2011 | Campbell et al. |
| 2011/0076560 | A1 | 3/2011 | Scordilis-Kelley et al. |
| 2011/0177398 | A1 | 7/2011 | Affinito et al. |
| 2011/0206992 | A1 | 8/2011 | Campbell et al. |
| 2012/0048729 | A1 | 3/2012 | Mikhaylik et al. |
| 2012/0070746 | A1 | 3/2012 | Mikhaylik et al. |
| 2012/0202112 | A1 | 8/2012 | Yushin et al. |
| 2012/0321959 | A1 | 12/2012 | Yushin et al. |
| 2012/0328952 | A1 | 12/2012 | Yushin et al. |
| 2013/0220974 | A1 | 8/2013 | Yushin |
| 2013/0224594 | A1 | 8/2013 | Yushin et al. |
| 2014/0050992 | A1* | 2/2014 | Panchenko .......... H01M 4/133 429/338 |
| 2014/0193713 | A1 | 7/2014 | Kumaresan et al. |

FOREIGN PATENT DOCUMENTS

| | | |
|---|---|---|
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2012/150060 A1 | 11/2012 |
| WO | WO 2012/150061 A1 | 11/2012 |
| WO | WO 2012/150062 A1 | 11/2012 |
| WO | WO 2012/160763 A1 | 11/2012 |
| WO | WO 2013/001693 A1 | 1/2013 |

OTHER PUBLICATIONS

Ahn et al., Electrochemical Properties of Sulfur with Various Particle Size for Lithium Sulfur Batteries. 44th Power Sources Conference 2010. Las Vegas, Nevada. Jun. 14-17, 2010.

Alamgir et al., Room Temperature Polymer Electrolytes. Lithium Batteries, New Materials, Developments and Perspectives, Chapter 3, pp. 93-136, Elsevier, Amsterdam (1994).

Brunauer et al., Adsorption of gases in multimolecular layers. J Am Chem Soc. Feb. 1938;60:309-319.

Chen et al. A hierarchical architecture S/MWCNT nanomicrosphere with large pores for lithium sulfur batteries. Phys. Chem. Chem. Phys. 2012; 14:5376-5382.

Choi et al., Challenges Facing Lithium Batteries and Electrical Double-Layer Capacitors. Angew. Chem. Int. Ed. 2012; 51: 9994—10024.

Ding et al. Encapsulating Sulfur into Hierarchically Ordered Porous Carbon as a High-Performance Cathode for Lithium—Sulfur Batteries. Chem Eur. 2013; 19:1013-1019.

Dominey, Current State of the Art on Lithium Battery Electrolytes. Lithium Batteries, New Materials, Developments and Perspectives, Chapter 4, pp. 137-165, Elsevier, Amsterdam (1994).

Evers et al. Understanding the Nature of Absorption/Adsorption in Nanoporous Polysulfide Sorbents for the Li—S Battery. J. Phys. Chem. C. 2012; 116:19653-19658.

Fanous et al. Structure-Related Electrochemistry of Sulfur-Poly(acrylonitrile) Composite Cathode Materials for Rechargeable Lithium Batteries. Chem. Mater. 2011; 23:5024-5028.

Fu et al. Core-shell structured sulfur-polypyrrole composite cathodes for lithiumsulfur batteries. RSC Advances. 2012; 2:5927-5929.

Fu et al. Orthorhombic Bipyramidal Sulfur Coated with Polypyrrole Nanolayers As a Cathode Material for Lithium—Sulfur Batteries. J. Phys. Chem. C. 2012; 116:8910-8915.

George, Atomic Layer Deposition: An Overview. Chem Rev. 2010; 110:111-131.

Guo et al. Lithium—Sulfur Battery Cathode Enabled by Lithium—Nitrile Interaction. J. Am. Chem. Soc. 2013; 135:763-767. Supporting Information.

Hassoun et al. A High-Performance Polymer Tin Sulfur Lithium Ion Battery. Angew. Chem. Int. Ed. 2010; 49: 2371—2374.

Hayashi et al. All-solid-state rechargeable lithium batteries with Li2S as a positive electrode material. Journal of Power Sources. 2008; 183:422-426.

He et al. High "C" rate Li-S cathodes: sulfur imbibed bimodal porous carbons. Energy Environ. Sci., 2011; 4:2878-2883.

Lai et al. Synthesis and Electrochemical Performance of Sulfur/Highly Porous Carbon Composites. J. Phys. Chem. C. 2009; 113:4712-4716.

Lee et al. Surface-Initiated Growth of Thin Oxide Coatings for Li—Sulfur Battery Cathodes. Adv Energy Mater. 2012; 2:1490-1496.

Li et al. A Polyaniline-Coated Sulfur/Carbon Composite with an Enhanced High-Rate Capability as a Cathode Material for Lithium/Sulfur Batteries. Adv. Energy Mater. 2012; 2: 1238-1245.

Marmorstein, Improved performance of Li/S Cells. 44th Power Sources Conference 2010. Las.Vegas, Nevada. Jun. 14-17, 2010.

Mikhaylik et al. Increasing Li-S Battery Cycle Life, and Improving Safety, through Application of a Variety of Coating Techniques. 54th Annual Technical Proceedings, Chicago, IL. Apr. 16-21, 2011.

Park et al. One-step synthesis of a sulfur-impregnated graphene cathode for lithium—sulfur batteries, Phys. Chem. Chem. Phys. 2012; 14:6796-6804.

Rao et al. Porous carbon-sulfur composite cathode for lithium/sulfur cells. Electrochemistry Communications. 2012; 17:1-5.

Takeuchi et al. Preparation of electrochemically active lithium sulfide—carbon composites using spark-plasma-sintering process. Journal of Power Sources. 2010; 195:2928-2934.

Wang et al. Analysis of the synthesis process of sulphur—poly(acrylonitrile)-based cathode materials for lithium batteries. J. Mater. Chem. 2012; 22:22077-22081.

Wang et al. Graphene-Wrapped Sulfur Particles as a Rechargeable Lithium-Sulfur Battery Cathode Material with High Capacity and Cycling Stability. Nano Lett. 2011; 11:2644-2647.

Wang et al. Polymer lithium cells with sulfur composites as cathode materials. Electrochimica Acta. 2003; 48:1861-1867.

(56) References Cited

OTHER PUBLICATIONS

Wang, et al., Charge/discharge characteristics of sulfurized polyacrylonitrile composite with different sulfur content in carbonate based electrolyte for lithium batteries. Electrochimica Acta 2012; 72:114—119.

Yin et al. Polyacrylonitrile/graphene composite as a precursor to a sulfur-based cathode material for high-rate rechargeable Li—S batteries. Energy Environ. Sci. 2012; 5:6966-6972.

Zhang et al. Enhancement of long stability of sulfur cathode by encapsulating sulfur into micropores of carbon spheres. Energy Environ. Sci. 2010; 3:1531-1537.

Zhang et al. Facile and effective synthesis of reduced graphene oxide encapsulated sulfur via oil/water system for high performance lithium sulfur cells. J. Mater. Chem. 2012; 22:11452-11454.

Zheng et al. Novel nanosized adsorbing sulfur composite cathode materials for the advanced secondary lithium batteries. Electrochimica Acta. 2006; 51:1330-1335.

International Preliminary Report on Patentability for PCT/US2014/010680 mailed Jul. 23, 2015.

International Search Report and Written Opinion for PCT/US2014/010689 mailed Jun. 10, 2014.

International Preliminary Report on Patentability for PCT/US2014/010689 mailed Jul. 23, 2015.

\* cited by examiner

CONDUCTIVITY CONTROL IN ELECTROCHEMICAL CELLS

RELATED APPLICATIONS

This application claims priority under 35 U.S.C. §119(e) to U.S. Provisional Application No. 61/750,139, filed Jan. 8, 2013, entitled "Conductivity Control in Electrochemical Cells," which is incorporated herein by reference in its entirety for all purposes.

TECHNICAL FIELD

Electrochemical cells comprising electrodes having desirable electronic conductivities and electrolytes having desirable ionic conductivities are generally described.

BACKGROUND

An electrochemical cell typically includes a cathode and an anode which participate in an electrochemical reaction to produce current. Generally, electrochemical reactions are facilitated by an electrolyte, which can contain free ions and can behave as an ionically conductive (and electronically insulating) medium.

In many electrochemical cell systems, electrode active material can precipitate in the cathode during the course of discharge or charge process. For example, in lithium-sulfur electrochemical cells, polysulfides such as $S^{2-}$ ions formed during the electrochemical reaction can react with Li+ ions to precipitate as solid $Li_2S$. The slate precipitate can deposit within the pores of the cathode, which can block electrolyte from reaching electrode active material located within the pores of the cathode and reduce system performance. If large amount of $Li_2S$ precipitates on a surface of the cathode (for example, at the interface between the cathode and the separator), then a thick sheet of solid (commonly called slate) can result. This slate can plug the pores in the cathode and prevent the $Li^+$ ions from reaching the interior of the cathode to react further. This, in turn, will cause the cell voltage to reach the end-of-discharge cut-off voltage prematurely, even though some amount of unreacted active materials are still available in the interior of the cell, which results in the reduction in the specific energy of the cathode.

The problem of excessive solid formation at unwanted locations (and the resulting pore-blocked) is not limited to lithium-sulfur electrochemical cells. For example, such solids formation can lead to problems in zinc/air, aluminum/air, lithium/air, lithium/$SO_2$, lithium/$SOCl_2$, and lithium/$SO_2Cl_2$, systems.

Electrodes and electrochemical cells configured to inhibit pore-blocking due to formation of solid precipitates would be desirable.

SUMMARY

Electrochemical cells comprising components with desirable electronic and ionic conductivities, and associated systems and methods, are generally described. The subject matter of the present invention involves, in some cases, interrelated products, alternative solutions to a particular problem, and/or a plurality of different uses of one or more systems and/or articles.

In one aspect, an energy storage device is provided. The energy storage device comprises, in certain embodiments, a first electrode comprising a first electrode active material and having a first electrode electronic conductivity; an electrolyte having an ionic conductivity; and a second electrode comprising a second electrode active material, wherein the first electrode electronic conductivity is less than or equal to about 200% of the ionic conductivity of the electrolyte.

In some embodiments, the energy storage device comprises a first electrode comprising a first electrode active material and having an electrode electronic conductivity of about 700 mS/cm or less; an electrolyte; and a second electrode comprising a second electrode active material.

The energy storage device comprises, in some embodiments, a first electrode comprising a first electrode active material and a total pore volume; an electrolyte; and a second electrode comprising a second electrode active material, wherein the energy storage device is configured such that the first and second electrode active materials undergo a reaction to form a volume of solid reaction product during operation of the energy storage device, and the total pore volume of the first electrode is between about 100% and about 300% of the volume of the solid reaction product formed when the reaction has proceeded to substantial completion.

In certain embodiments, an electrode is provided. The electrode comprises, in some embodiments, a porous support structure comprising at least one electronically conductive material; an electronic conductivity inhibitor coating disposed over at least a portion of the electronically conductive material within the porous support structure such that the porous support structure maintains at least a portion of its pore volume; and an electrode active material at least partially disposed within the pores of the porous support structure.

In certain embodiments, the electrode comprises a porous support structure comprising an electronically conductive material, an electronic conductivity inhibitor, and an electrode active material at least partially disposed within the pores of the porous support structure.

In some embodiments, a method of forming an electrode is provided. The method comprises, in some embodiments, providing a porous support structure comprising at least one electronically conductive material, and at least partially coating the electronically conductive material of the porous support structure with an electronic conductivity inhibitor material.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
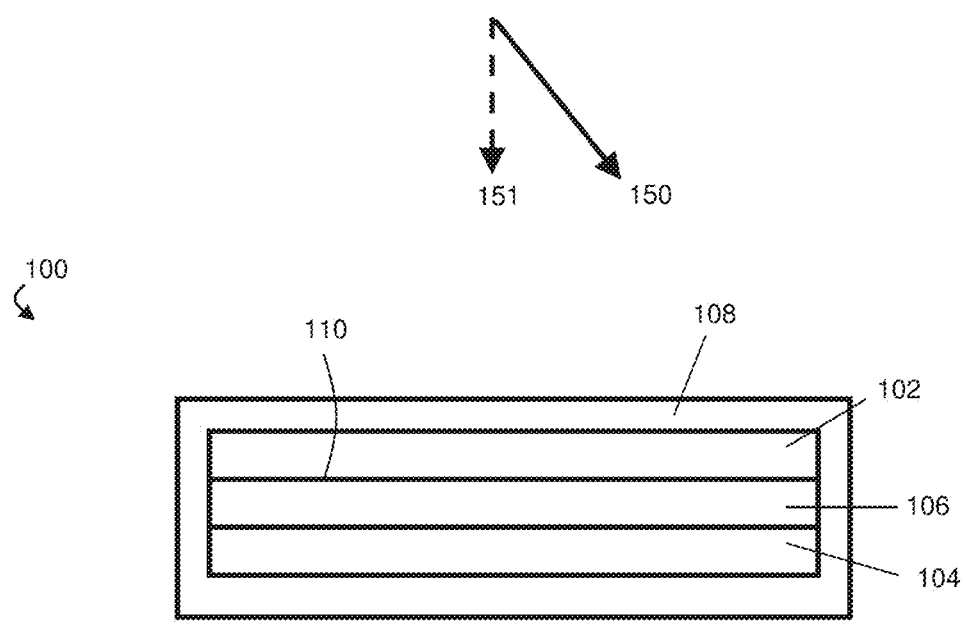
FIG. 1 is a cross-sectional schematic illustration of an energy storage device, according to certain embodiments.

Electrochemical cells comprising components having desirable electronic and ionic conductivities, and associated systems and methods, are generally described. Certain embodiments relate to improving the percentage of electrode active material used in an electrochemical cell during charge and discharge. During the discharge of many types of electrochemical cells comprising porous cathodes (including, for example, lithium/sulfur electrochemical cells), the electric current in the electrochemical cell is transported via two different mechanisms: by the transport of ions in the electrolyte (ionic current) and by the transport of electrons in the cathode matrix (electronic current). In previous electrochemical cells, under normal (baseline) conditions, the electronic conductivity of the cathode matrix is significantly higher than the ionic conductivity of the electrolyte. Thus, in such electrochemical cells, the transport of electrode active ions (e.g., Li+ ions in the case of lithium/sulfur cells) from the anode surface to a given point in the cathode is the rate determining step of the overall discharge process. In such cases, electrochemical reduction (e.g., of polysulfides in the case of lithium sulfur cells) occurs preferably at the cathode/separator interface. This leads to excessive precipitation of the reaction products (e.g., slate in the case of lithium/sulfur cells) at the cathode/separator interface. The buildup of reaction products such as slate decreases the porosity and limits mass transport of ionic species in the cathode, resulting in the blocking of pores. In such cases, electrode active ions (such as Li+ ions in the case of lithium/sulfur cells) cannot reach the interior of the cathode due to the blockage or pores, thus resulting in premature end of discharge which manifests itself as lower specific discharge capacity.

It has been discovered, according to one aspect of the present invention, that the pore blockage problem described above can be alleviated by decreasing the rate at which electrons are transported from the current collector (e.g., the cathode current collector, in the case of lithium/sulfur electrochemical cells) to the electrolyte of the electrochemical cell. One way in which this can be accomplished is by employing electrochemical cells in which at least one electrode is made of material having a relatively low electronic conductivity. It has previously been believed that electrodes within electrochemical cells should have electronic conductivities that are as large as possible in order to expedite the transport of electrons out of the electrode and through the external load that is being powered. However, it has been unexpectedly discovered, according to one aspect of the present invention, that the use of electrodes having relatively low electronic conductivities can inhibit the degree to which undesired solid byproducts are produced at undesirable locations within the electrochemical cell. While lowering the electronic conductivity of the electrode support matrix will often cause some loss in operating voltage (because the electrode is not as electronically conductive), any adverse impacts from the lowered operating voltage are often more than made up for by much higher pore accessibility. Such solid formation at unwanted locations can be inhibited (or prevented), for example, in electrochemical cells in which the electronic conductivity of one or both electrodes is less than or equal to about 200% of the ionic conductivity of the electrolyte of the electrochemical cell. In certain embodiments, the use of electrodes having electrode electronic conductivities of about 700 mS/cm or less can inhibit the production of unwanted solids during cycling of the cell. Not wishing to be bound by any particular theory, it is believed that the use of electrodes with relatively high electronic conductivities can cause rapid formation of precipitate near the electrolyte/electrode interface, while the use of electrodes having relatively low electronic conductivities slows the pace of precipitation and allows for precipitate precursor to travel farther into the pores of the electrode prior to forming the precipitate.

The desired electrode electronic conductivities described herein are generally lower than those used in electrochemical cells employing porous electrodes. Typically, in systems employing porous electrodes loaded with electrode active material, the electrical conductivity of the porous support structure is configured to be relatively high, for example, by fabricating the support structure out of highly electronically conductive carbon(s) or metal(s). The use of highly electronically conductive materials was thought to be beneficial because it allows for very efficient transport of electrons from within the bulk of the porous electrode, to the current collectors adjacent the porous electrode, and subsequently out of the electrochemical cell. Unexpectedly, it was discovered that lowering the electronic conductivity of the porous support material of the electrode (which one of ordinary skill in the art would assume would inhibit cell performance by inhibiting electron transport out of the electrode) inhibits excessive solid formation at unwanted locations and enhances cell performance.

By inhibiting or prohibiting the buildup of excessive solids at unwanted locations within the electrochemical cell electrodes, electrode pores remain open and electrode active material remains more accessible to the electrolyte of the electrochemical cell. When electrode active material is more accessible to the electrolyte, higher active materials utilization can be achieved, even when electrodes having relatively large thicknesses are employed. The ability to use thicker electrodes can allow one to design electrochemical cells with smaller weight and volume fractions of inactive materials (e.g., electrode substrates, separators, terminals), which can lead to increases in the specific energy and energy density of the electrochemical cell. The use of thicker electrodes also allows for the use of higher current densities (due to the fact that higher loadings of active material per geometric area of the electrode can be employed), which leads to faster charge and discharge rates, which are generally desirable to consumers.

In addition, higher active material surface loadings and lower electrode porosities can be employed while maintaining operability of the electrochemical cell. The use of electrodes with relatively low porosities can enhance the structural integrity of the electrochemical cell, which can be beneficial, for example, when anisotropic forces are applied to electrodes of the electrochemical cell as described, for example, in U.S. Patent Application Publication No. 2010/0035128, filed Aug. 4, 2009, and entitled "Application of Force in Electrochemical Cells" to Scordilis-Kelley et al., which is incorporated herein by reference in its entirety. In addition, the use of electrodes with relatively low porosities can allow one to configure electrochemical cells such that less electrolyte is required to achieve a given power output, which can enhance the specific energy and energy density of the electrochemical cell.

FIG. 1 is an exemplary cross-sectional schematic illustration of energy storage device 100, according to certain embodiments. In FIG. 1, energy storage device 100 comprises first electrode 102, second electrode 104, and electrolyte 106. First electrode 102 can comprise a first electrode active material, and second electrode 104 can comprise a second electrode active material. First electrode 102 and second electrode 104 can have opposite polarities. For example, in certain embodiments, first electrode 102 can be an anode and second electrode 104 can be a cathode. In other embodiments, first electrode 102 can be a cathode while second electrode 104 can be an anode.

Optionally, the cell may also include containment structure 108. In addition, the cell may also, optionally, include additional layers (not shown), such as a multi-layer structure that protects an electroactive material (e.g., an electrode) from the electrolyte, as described in more detail in U.S. Patent Application Publication No. 2007/0221265, filed Apr. 6, 2006, entitled, "Rechargeable Lithium/Water, Lithium/Air Batteries" to Affinito et al., which is incorporated herein by reference in its entirety. Additionally, non-planar arrangements, arrangements with proportions of materials different than those shown, and other alternative arrangements are useful in connection with the present invention. A typical electrochemical cell also would include, of course, current collectors, external circuitry, a housing structure, and the like. Those of ordinary skill in the art are well aware of the many arrangements that can be utilized with the general schematic arrangement as shown in the figures and described herein.

Figure 2A:
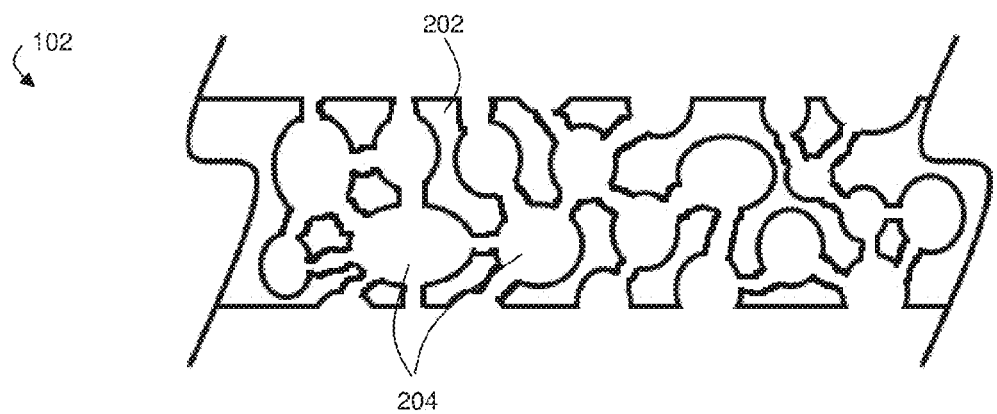
FIGS. 2A-2C are cross-sectional schematic illustrations, according to some embodiments, of electrodes.
Figure 2B:
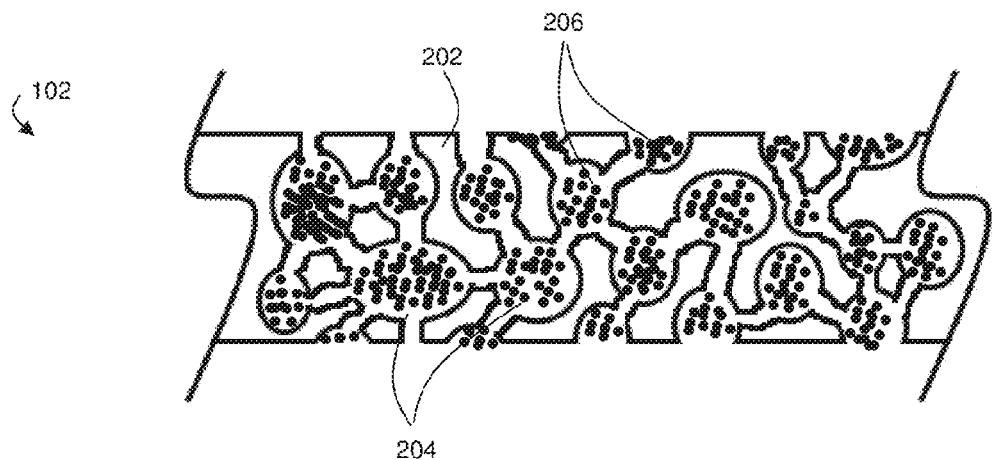

FIGS. 2A-2B are cross-sectional schematic illustrations of an exemplary electrode 102 according to certain embodiments. In FIG. 2A, electrode 102 comprises porous support 202 comprising a plurality of pores 204. The term "pore" generally refers to conduits, voids, or passageways, at least a portion of which is surrounded by the medium in which the pore is formed such that a continuous loop may be drawn around the pore while remaining within the medium. Generally, voids within a material that are completely surrounded by the material (and thus, not accessible from outside the material, e.g. closed cells) are not considered pores within the context of the invention. It should be understood that, in cases where the article comprises an agglomeration of particles, pores include both the interparticle pores (i.e., those pores defined between particles when they are packed together, e.g. interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like. Properties of pores, including pore size distribution, may be determined using, for example, ASTM Standard Test D4284-07.

Electrode active material can be at least partially disposed within the pores of the porous support structure. For example, in FIG. 2B, pores 204 of porous support structure 202 are loaded with electrode active material 206. As described in more detail below, porous support structure can be formed of a substantially continuous structure in which pores have been formed, as might be observed, for example, in a foam or mesh material. On the other hand, porous support structure can also be formed by agglomerating particles (e.g., porous particles) to form pores between the agglomerated particles (and, in cases in which the particles themselves are porous, within the agglomerated particles themselves). Methods of forming a variety of electrodes suitable for use in the invention are described in more detail below.

Figure 2C:
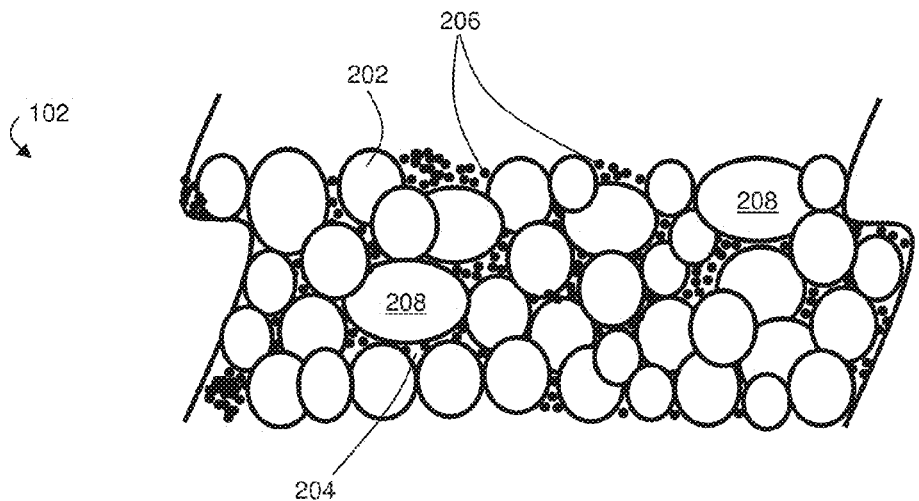

Referring back to FIG. 1, first electrode 102 can have a first electrode electronic conductivity. The electrode electronic conductivity is generally measured as the electronic conductivity of the electrode prior to discharge of the electrode, and is measured while the electrode contains the electrode active material and any material on which the electrode active material is supported, such as a porous support structure, as illustrated in FIGS. 2B-2C. The electrode electronic conductivity is measured while the maximum amount of electrode active material is present within the electrode (i.e., while the electrode is fully charged). Such electronic conductivity can be determined using electrochemical impedance spectroscopy (EIS). Generally, electrochemical impedance spectroscopy conductivity measurements are made by assembling a cell in which the electrode that is being measured is positioned between two electronically conductive substrates. The resistance across the porous electrode (which has known dimensions) is determined by passing a high frequency current across the electronically conductive substrates. Using this resistance measurement, the electronic conductivity of the electrode can then be calculated by back calculating the electronic conductivity from the measured conductivity using the geometry across which the electronic conductivity was measured. In this context, the geometry across which the electronic conductivity is measured is calculated using the geometric surfaces of the electrode, which will be understood by those of ordinary skill in the art to refer to the surface defining the outer boundaries of the electrode, for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.).

Figure 2D:
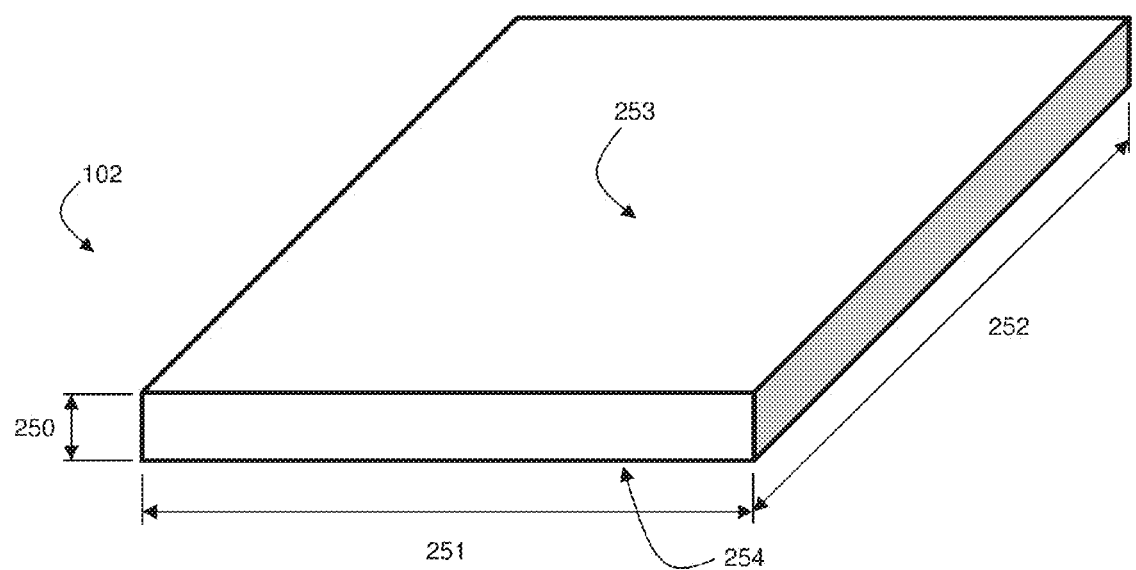
FIG. 2D is a schematic diagram illustrating a method by which the electrode electronic conductivity of an electrode can be determined.

As one specific example, referring to FIG. 2D, the electrode electronic conductivity of electrode having a thickness 250, width 251, and depth 252 can be calculated by positioning electronically conductive substrates across the electrode, one electronically conductive substrate in contact with surface 253 of the electrode and a second electronically conductive substrate in contact with surface 254 of the electrode. If determining the electronic conductivity of an electrode of a potentially infringing electrochemical cell, one or both of the electronically conductive substrates may correspond to a current collector of the electrochemical cell. An electrical potential can be applied across surfaces 253 and 254, and the resistance of electrode 102 can be measured. The electrode electronic conductivity can then be calculated as:

$$\text{Conductivity} = \frac{l}{A \cdot R} \quad [1]$$

wherein l is the length along which the resistance measurement is taken (corresponding to thickness 250 in FIG. 2D), A is the cross-sectional area orthogonal to the length along which the resistance measurement is taken (corresponding to the product obtained by multiplying width 251 by depth 252 in FIG. 2D), and R is the measured resistance.

Electrolyte 106 can function as a medium for the storage and transport of ions, and in the special case of solid electrolytes and gel electrolytes, these materials may additionally function as a separator between the anode and the cathode. Electrolyte 106 can be substantially electronically non-conductive, to prevent short circuiting between the anode and the cathode. Electrolyte 106 can have an ionic conductivity, which can allow for the transport of ions between the anode and the cathode. The ionic conductivity of an electrolyte is measured by using an ionic conductivity meter such as a Digibridge® instrument. The ionic conductivity meter generally includes two parallel platinized platinum electrodes. To measure the conductivity, the two electrodes are immersed in the electrolyte. A small amplitude (e.g., about 5 mV) high frequency (e.g., about 10 kHz) voltage can be applied across these two electrodes and the resulting resistance across these electrodes can be measured. The ionic conductivity of the electrolyte can then be calculated from this measured resistance value.

In certain embodiments, the ratio of the electrode electronic conductivity of the first electrode to the ionic conductivity of the electrolyte can be relatively low. As discussed supra, configuring the energy storage device such that the ratio of the electrode electronic conductivity of the first electrode to the ionic conductivity of the electrolyte is low can inhibit the formation of solid in unwanted locations within the energy storage device. In certain embodiments, the first electrode electronic conductivity is less than or equal to about 200% of the ionic conductivity of the electrolyte, less than or equal to about 100% of the ionic conductivity of the electrolyte, or less than or equal to about 50% of the ionic conductivity of the electrolyte. In some embodiments, the first electrode electronic conductivity is from about 1% to about 200% of the ionic conductivity of the electrolyte, from about 1% to about 100% of the ionic conductivity of the electrolyte, or from about 1% to about 50% of the ionic conductivity of the electrolyte. One of ordinary skill in the art would understand that, when comparing the electrode electronic conductivity of an electrode to the ionic conductivity of an electrolyte, the same units (e.g., mS/cm) should be used for both the electronic conductivity and the ionic conductivity.

In certain embodiments, the first electrode can be configured to have a relatively low electrode electronic conductivities, which can help inhibit unwanted solid formation within the energy storage device. In some embodiments, the first electrode of the energy storage device has an electrode electronic conductivity of about 700 mS/cm or less, of about 100 mS/cm or less, of about 50 mS/cm or less, of about 15 mS/cm or less, or of about 2 mS/cm or less. In some embodiments, the first electrode of the energy storage device has an electrode electronic conductivity of about 0.1 mS/cm or more (e.g., from about 0.1 mS/cm to about 700 mS/cm, from about 0.1 mS/cm to about 100 mS/cm, from about 0.1 mS/cm to about 50 mS/cm, from about 0.1 mS/cm to about 15 mS/cm, or from about 0.1 mS/cm to about 2 mS/cm).

In some embodiments, the second electrode of the energy storage device can also have a relatively low electrode electronic conductivity. For example, in certain embodiments, the second electrode electronic conductivity is less than or equal to about 200% of the ionic conductivity of the electrolyte, less than or equal to about 100% of the ionic conductivity of the electrolyte, or less than or equal to about 50% of the ionic conductivity of the electrolyte. In some embodiments, the second electrode electronic conductivity is from about 1% to about 200% of the ionic conductivity of the electrolyte, from about 1% to about 100% of the ionic conductivity of the electrolyte, or from about 1% to about 50% of the ionic conductivity of the electrolyte. In certain embodiments, the second electrode of the energy storage device has an electrode electronic conductivity of about 700 mS/cm or less, of about 100 mS/cm or less, of about 50 mS/cm or less, of about 15 mS/cm or less, or of about 2 mS/cm or less. In some embodiments, the second electrode of the energy storage device has an electrode electronic conductivity of about 0.1 mS/cm or more (e.g., from about 0.1 mS/cm to about 700 mS/cm, from about 0.1 mS/cm to about 100 mS/cm, from about 0.1 mS/cm to about 50 mS/cm, from about 0.1 mS/cm to about 15 mS/cm, or from about 0.1 mS/cm to about 2 mS/cm).

In certain embodiments the electrolyte can have an ionic conductivity of about 350 mS/cm or less, of about 10 mS/cm or less, of about 1 mS/cm or less, or of about 0.1 mS/cm or less (and/or, as low as 0.001 mS/cm or lower).

Another way of overcoming the pore blockage problems associated with many previous electrochemical cells is to reduce the rate of the electrochemical reduction reaction on the pore wall surfaces of an electrode (e.g., the cathode) and to make the electrochemical reduction reaction the rate determining step. This can be achieved, in certain embodiments, by passivating the pore wall surfaces of the electrode (e.g., cathode) surface. One way of passivating the pore wall surfaces is to coat the pore wall surfaces with one or more materials that have low electronic conductivities. For example, the pore wall surfaces of the electrode can be coated with a thin film of a material having a low electronic conductivity. Reduction of the conductivity of the pore wall surfaces could lead to a more uniform distribution of the electrochemical reduction reaction across the thickness of the electrode, thereby inhibiting (or eliminating) the degree to which solid byproducts are concentrated within certain regions of the electrode, thereby blocking electrode pores. In the case of lithium/sulfur electrochemical cells, when the pore wall surfaces are coated with a low electronic conductivity material, the electrochemical reduction of polysulfide will not be preferred near the surface of the cathode (cathode/separator interface), which can result in a more uniform precipitation of solid reaction products across the thickness of the cathode and thus prevent the pore-blocking at the cathode/separator interface. When more uniform solid precipitation is achieved in the electrode, the premature end of discharge can be inhibited or prevented, thereby increasing the specific discharge capacity of the electrochemical cell.

Accordingly, in certain embodiments, an electrode is provided comprising a porous support structure comprising an electronically conductive material in which the electronically conductive material within the porous support structure is at least partially coated with an electronic conductivity inhibitor. In some embodiments, the electrode is part of an electrochemical cell, and the electronic conductivity inhibitor is configured to inhibit the transport of electrons from the porous support structure to the electrolyte of the electrochemical cell. The electronic conductivity inhibitor can act, in certain embodiments, as a passivation layer.

In certain embodiments, the electronic conductivity inhibitor coating is disposed over the electronically conductive material within the porous support structure such that at least a portion of the pore volume of the porous support structure is maintained after the electronic conductivity inhibitor coating has been formed. For example, in certain embodiments, the pore volume of the porous support structure including the electronic conductivity inhibitor is at least about 75%, at least about 90%, at least about 95%, or at least about 99% of the pore volume of the same porous support structure, but without the electronic conductivity inhibitor coating. That is to say, in certain embodiments, the presence of the electronic conductivity inhibitor reduces the pore volume of the porous support structure by less than about 25%, less than about 10%, less than about 5%, or less than about 1%.

A variety of materials can be used to form the electronic conductivity inhibitor coating over the porous support structure of the electrode. Suitable materials include, but are not limited to, ceramics and amorphous materials. Examples of such materials include oxides, silicates, and/or aluminosilicates of metals or metalloids (e.g., indium tin oxide, aluminum oxides, aluminum silicates, silicon oxides, calcium aluminosilicates, and/or sodium aluminosilicates). In certain embodiments, all or part of the electronic conductivity inhibitor coating is formed of a polymer, such as azobenzene-based polymers, poly(3,4-ethylenedioxythiophene)-based polymers, polyacrylonitrile-based polymers, and/or polyaniline-based polymers, In certain embodiments, all or part of the electronic conductivity inhibitor coating is formed of an electrically insulating material. In some embodiments, the electronically insulating material has a bulk electrical resistivity of greater than about $10^6$ ohm-m, greater than about $10^8$ ohm-m, or greater than about $10^{10}$ ohm-m at 20° C.

The electronic conductivity inhibitor coating can be formed on the porous support structure via a variety of techniques, such as atomic layer deposition, thermal growth, dip coating, physical vapor deposition, chemical vapor deposition, plasma assisted physical vapor deposition, plasma assisted chemical vapor deposition, and/or electropolymerization.

The electronically conductive material from which the porous support structure is made (e.g., prior to the coating of the electronically conductive material with electronic conductivity inhibitor) can have, in certain embodiments, a bulk electrical resistivity of less than about $10^{-3}$ ohm-m, less than about $10^{-4}$ ohm-m, or less than about $10^{-5}$ ohm-m at 20° C. For example, in some embodiments, all or part of the porous support structure can be formed of graphite, which has a bulk electrical resistivity of between about $2.5 \times 10^{-6}$ and about $5 \times 10^{-6}$ ohm-m at 20° C. and/or nickel, which has a bulk electrical resistivity of about $7 \times 10^{-8}$ ohm-m at 20° C. In certain embodiments, the electronically conductive material within the porous support structure is formed of a metal such as nickel, aluminum, or other metals. In some embodiments, the electronically conductive material within the porous support structure is formed of an electronically conductive carbon such as metal, such as graphite, carbon black, or other carbons.

In certain embodiments, the electronic conductivity inhibitor coating can be applied after the porous support structure has been assembled. For example, a porous support structure can be made of a metal foam, and the electronic conductivity inhibitor coating can be applied to the foam. As another example, the porous support structure can be formed by agglomerating a plurality of particles (e.g., electrically conductive particles such as carbon particles), optionally with the use of a binder, after which, the electronic conductivity inhibitor can be applied.

In some embodiments, the electronic conductivity inhibitor coating can be applied prior to assembling the porous support structure. For example, in certain embodiments, the porous support structure is formed by agglomerating a plurality of particles (e.g., electrically conductive particles such as carbon particles). In some such embodiments, the electronic conductivity inhibitor coating is applied to the particles prior to assembling the particles to form the porous support structure.

In certain embodiments, the electronic conductivity inhibitor coating comprises a thin layer. For example, in some embodiments, the electronic conductivity inhibitor coating has a thickness of less than about 500 microns, less than about 100 microns, less than about 10 microns, less than about 1 micron, less than about 100 nm, less than about 10 nm, or less than about 1 nm (and/or, down to a monolayer, bi-layer, or otherwise very thin layer). In other embodiments, thicker coatings of electronic conductivity inhibitor may be used.

One advantage of employing the inventive electrodes described herein is an increase in the theoretical capacity of the electrochemical cell. For example, many lithium sulfur cells with standard cathodes (i.e., cathodes in which the electronic conductivities of the components have not been tailored to produce a more spatially distributed electrochemical reaction within the cathode) are capable of achieving only 75% of theoretical capacity at C/5 discharge rate. On the other hand, the inventive electrode configurations described herein are capable of achieving much higher capacities (e.g., at least 80% of theoretical capacity, at least 90% of theoretical capacity, at least 95% of theoretical capacity or higher). In certain embodiments, a combination of the strategies outlined above can be employed to control the transport of electrons from a current collector to the electrolyte. For example, in certain embodiments, one or more electrodes within an electrochemical cell can be configured such that the electrode has an electrode electronic conductivity that is within a desired range (including any of the ranges outlined above) and the porous support structure within that same electrode can be passivated, for example, by at least partially coating the porous support structure with an electronic conductivity inhibitor.

The embodiments described herein can be used in association with a variety of types of energy storage devices (including electrochemical cells) in which precipitates are potentially formed as electrochemical reaction side-products. In certain embodiments, the electrochemical cell can be a lithium-based electrochemical cell, and one of the electrodes (e.g., second electrode 104) can comprise an electrode active material comprising lithium. In certain embodiments, the electrode active material (e.g., within second electrode 104) comprises lithium metal or a lithium alloy.

In some embodiments, an electrode of the energy storage device (e.g., first electrode 102) comprises sulfur as an electrode active material. For example, the material within the pores can comprise electrode active sulfur-containing materials. "Electrode active sulfur-containing materials," as used herein, refers to electrode active materials which comprise the element sulfur in any form, wherein the electrochemical activity involves the oxidation or reduction of sulfur atoms or moieties. In certain embodiments, the electrode active sulfur-containing sulfur comprises elemental sulfur (i.e., $S_8$). In some embodiments, the electrode active sulfur-containing material comprises a mixture of elemental sulfur and a sulfur-containing polymer. Suitable electrode active sulfur-containing materials may include, but are not limited to, elemental sulfur, sulfides, or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat.

No. 6,201,100 issued Mar. 13, 2001, to Gorkovenko et al., and PCT Publication No. WO 99/33130. Suitable electrode active sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electrode active sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al. In some embodiments, an electrode active sulfur-containing material of an electrode comprises at least about 40 wt % sulfur, at least about 50 wt % sulfur, at least about 75 wt % sulfur, or at least about 90 wt % sulfur.

In some embodiments in which the first electrode comprises an electrode active material comprising sulfur, the second electrode comprises an electrode active material comprising lithium, such as when the energy storage device corresponds to a lithium-sulfur electrochemical cell (e.g., a rechargeable lithium-sulfur electrochemical cell).

In certain embodiments, the energy storage device comprises a first electrode in which air is used as an electrode active material, such as metal-air batteries. In some such systems, the second electrode of the energy storage device comprises a metal such as zinc, aluminum, or lithium. In some embodiments, the energy storage device can correspond to, in certain embodiments, a zinc-air electrochemical cell, an aluminum-air electrochemical cell, or a lithium-air electrochemical cell. In zinc-air electrochemical cells, for example, the oxidation of zinc at the anode and the reduction of oxygen in the cathode is generally used to produce electricity. This electrochemical system can result in the precipitation of zinc oxide(s) at the cathode. The configurations described herein can be used to control the precipitation of zinc at the cathode, maintaining porosity at the cathode, and enhancing cell performance. In aluminum-air electrochemical cells, the oxidation of aluminum at the anode and the reduction of oxygen in the cathode can result in the precipitation of aluminum salts at the cathode. In lithium-air electrochemical cells, the oxidation of lithium at the anode and the reduction of oxygen in the cathode is generally used to produce electricity, which can result in the precipitation of lithium peroxide at the cathode. The configurations described herein can be used to control the precipitation of such species at the cathodes of such electrochemical cells.

In some embodiments, the electrolyte comprises a chloride, such as a thionyl chloride or a sulfuryl chloride electrolyte. In some such embodiments, lithium can be used as an electrode. In certain such embodiments, carbon can be used as the other electrode. In such embodiments, the electrochemical cell can correspond to a lithium-thionyl chloride electrochemical cell or a lithium-sulfuryl chloride electrochemical cell. In such systems lithium chloride can precipitate during operation of the electrochemical cell. The configurations described herein can be used to control such precipitation and enhance cell performance.

As noted above, electrodes suitable for use in the embodiments described herein, including electrodes suitable for use in lithium-sulfur electrochemical cells, can have a variety of configurations and can be formed using a variety of methods. In some instances, the porous support structure can comprise a porous agglomeration of discrete particles, as illustrated, for example, in FIG. 2C. In FIG. 2C, porous support structure 202 comprises an agglomeration of particles 208. Particles 208 can be porous or non-porous. The porous support structure can be formed by mixing porous or non-porous particles with a binder to form a porous agglomeration. Electrode active material can be positioned within the interstices between the particles and/or the pores within the particles (in cases where porous particles are employed) to form the inventive electrodes described herein. For example, in FIG. 2C, electrode active material 206 is positioned between particles 208. Electrode active material 206 can also be positioned within particles 208 (e.g., when porous particles are employed), in certain embodiments.

In some embodiments, the porous support structure can be a "porous continuous" structure. A porous continuous structure refers to a continuous solid structure that contains pores within it, with relatively continuous surfaces between regions of the solid that define the pores. Examples of porous continuous structures include, for example, a piece of material that includes pores within its volume (e.g., a porous carbon particle, a metal foam, etc.). Porous support structure 202 in FIGS. 2A-2B is one example of a porous continuous structure. One of ordinary skill in the art will be capable of differentiating between a porous continuous structure and, for example, a structure which is not a porous continuous structure but which is a porous agglomeration of discrete particles (where the interstices and/or other voids between the discrete particles would be considered pores) by, for example, comparing SEM images of the two structures.

The porous support structure may be of any suitable shape or size. For example, the support structure can be a porous continuous particle with any suitable maximum cross-sectional dimension (e.g., less than about 10 mm, less than about 1 mm, less than about 500 microns, etc.). In some cases, the porous support structure (porous continuous or otherwise) can have a relatively large maximum cross-sectional dimension (e.g., at least about 500 microns, at least about 1 mm, at least about 10 mm, at least about 10 cm, between about 1 mm and about 50 cm, between about 10 mm and about 50 cm, or between about 10 mm and about 10 cm). In some embodiments, the maximum cross-sectional dimension of a porous support structure within an electrode can be at least about 50%, at least about 75%, at least about 90%, at least about 95%, at least about 98%, or at least about 99% of the maximum cross sectional dimension of the electrode formed using the porous continuous structure. The "maximum cross-sectional dimension" of an article (e.g., a porous support structure) generally refers to the largest distance between two opposed boundaries of an article that may be measured.

In some embodiments, the porous support structure can be an article with one relatively thin dimension relative to the other two, such as, for example, a film. For example, the porous support structure can be an article with a thickness of less than about 1 mm, less than about 500 microns, less than about 100 microns, between about 1 micron and about 5 mm, between about 1 micron and about 1 mm, between about 10 microns and about 5 mm, or between about 10 microns and about 1 mm, and a width and/or length at least about 100, at least about 1000, or at least about 10,000 times greater. Porous support structures described herein may also be of any suitable shape. For example, the support structure can be spherical, cylindrical, or prismatic (e.g., a triangular prism, rectangular prism, etc.). In some cases, the morphology of the support structure may be selected such that the support structure can be relatively easily integrated into an electrode for use in an electrochemical cell. For example, the support structure may comprise a thin film upon which additional components of an electrochemical cell (e.g., an electrolyte, another electrode, etc.) can be formed.

In some cases, porous particles can be used as a porous continuous structure. In some such embodiments, material (e.g., electrode active material) can be deposited within the pores of the particles, and the particles can be used to form an electrode. For example, porous particles containing electrode active material within their pores might be bound together (e.g., using binder or other additives) to form a composite electrode. Exemplary processes for forming such composite electrodes are described, for example, in U.S. Pub. No.: 2006/0115579, filed Jan. 13, 2006, entitled "Novel composite cathodes, electrochemical cells comprising novel composite cathodes, and processes for fabricating same", which is incorporated herein by reference in its entirety.

In some embodiments, the porous support structure might comprise a relatively large-scale porous continuous structure that, unlike the porous particles described above, is sized and shaped to serve as an electrode. In some embodiments, the maximum cross-sectional dimension of a porous continuous structure within an electrode can be at least about 50%, at least about 75%, at least about 90%, at least about 95%, at least about 98%, or at least about 99% of the maximum cross sectional dimension of the electrode formed using the porous continuous structure.

The use of such relatively large porous continuous structures can, in some embodiments, ensure that little or no binder is located within the electrode because binder would not be required to hold together small particles to form the porous support structure. In some embodiments, the electrode can include less than about 20 wt %, less than about 10 wt %, less than about 5 wt %, less than about 2 wt %, less than about 1 wt %, or less than about 0.1 wt % binder. In this context, "binder" refers to material that is not an electrode active material and is not included to provide an electrically conductive pathway for the electrode. For example, an electrode might contain binder to facilitate internal cohesion within the cathode.

Porous support structures can be formed using a variety of suitable materials (e.g., at least one of carbon, a polymer, a metal carbide, a metal nitride, and silicon). In certain embodiments, at least part of the porous support structure can be formed of carbon. For example, in certain embodiments, all or part of the porous support structure can be made up of a carbon that is formed by heating hydrocarbonaceous materials. Suitable hydrocarbonaceous materials include, for example, carbohydrates, including sugars (e.g., monosaccharides (e.g., fructose), disaccharides, or larger polysaccharides). Other suitable hydrocarbonaceous materials include starches (e.g., corn starch) and alcohols (e.g., phloroglucinol). In certain embodiments, combinations of these and/or other materials may be heated to form the material that makes up all or part of the porous support structure. In certain embodiments, such hydrocarbonaceous materials can be heated to temperatures of between about 300° C. and about 650° C. to produce the material from which the porous support structure is formed. In some such embodiments, heating the hydrocarbonaceous material results in the pyrolysis of the hydrocarbonaceous material to form relatively low-conductivity carbons, including carbons have electronic conductivities falling within the desired electrode electronic conductivity ranges described elsewhere herein.

In some embodiments, a polymer can be used to form all or part of the porous support structure. Suitable polymers for use in forming porous support structures include, but are not limited to, polyvinyl alcohol (PVA), phenolic resins (novolac/resorcinol), lithium polystyrenesulfonate (LiPSS), epoxies, UHMWPE, PTFE, PVDF, PTFE/vinyl copolymers, co-polymers/block co-polymers of the above and others. In some embodiments, two polymers can be used for their unique functionalities (e.g. PVA for adhesion, and LiPSS for rigidity, or resorcinol for rigidity and an elastomer for flexibility/toughness). The material used to form the porous support structure might include one or more conductive polymers such as, for example, poly(3,4-ethylenedioxythiphene) (PEDOT), poly(methylenedioxythiophene) (PM-DOT), other thiophenes, polyaniline (PANI), polypyrrole (PPy). Those of ordinary skill in the art would be capable of selecting a counter ion for a conductive polymer system, which can be selected from a variety of chemical species such as PSS for PEDOT, other well-known conductive polymers, and co and block co-polymers as above.

In certain embodiments, all or part of the porous support structure is formed of a ceramic material. Suitable ceramics include, but are not limited to, oxides, nitrides, carbides, and/or oxynitrides of metals and/or metalloids. For example, oxides, nitrides, carbides, and/or oxynitrides of aluminum, silicon, zinc, tin, vanadium, zirconium, magnesium, indium, and alloys thereof could be used to make the porous support structure.

In some embodiments, all or part of the porous support structure is formed of silicon.

In certain embodiments, the electrode electronic conductivity can be controlled by controlling the electronic conductivity of the porous support structure. For example, additives such as carbon-based additives (e.g., carbon black, carbon nanotubes, graphite, etc.), metals, and/or other electronically conductive materials can be added to an otherwise electronically non-conductive porous support material (e.g., a polymer, a ceramic, or other materials) to produce a porous support structure with an electronic conductivity within a desired range (e.g., with a sufficiently high electronic conductivity to transport electrodes out of the electrode and a sufficiently low electronic conductivity to avoid unwanted precipitation within the electrode during operation). Such electronically conductive materials can be incorporated into the porous support structure, for example, by incorporating the conductive materials into a melt of the nonconductive material and subsequently hardening the melt. In other embodiments, the material from which the porous support structure is formed inherently possesses a bulk electronic conductivity that falls within the target range. For example, carbon-based material formed by heating hydrocarbonaceous material (e.g., as described above) can have a relatively low bulk electronic conductivity, including any electronic conductivity falling within the desired ranges described elsewhere herein.

Porous support structures (and resulting electrodes) can be fabricated using a variety of methods. For example, in some embodiments, particles can be suspended in a fluid, and the fluid can be subsequently removed (e.g., via heat drying, vacuum drying, filtration, etc.) to produce the porous support structure in which the particles are adhered to each other. As mentioned above, in some cases, a binder can be used to adhere particles to form a composite porous support structure. In some embodiments, porous support structures can be fabricated by heating individual particles of a material until the particles are altered to form a porous support structure (e.g., a porous continuous structure), for example, via melting or sintering. In some embodiments, particles can be arranged such that they are in contact with each other, with interstices located between the particles. The particles can then be sintered to form a fused structure in which the interstices between the particles constitute the pores in the sintered structure. The total porosity, size of the pores, and other properties of the final structure could be controlled by selecting appropriate particles sizes and shapes, arranging them to form a desired packing density prior to sintering, and selecting appropriate sintering conditions (e.g., heating time, temperature, etc.).

In some embodiments, the porous support structure can be formed by combining a first material with a second material, and forming the pores of the support structure by removing one of the materials from the mixture. Removing one of the materials from the mixture can leave behind voids which ultimately form the pores of the porous support structure.

Another method that might be used to produce the porous support structures described herein includes 3D printing. 3D printing is known to those of ordinary skill in the art, and refers to a process by which a three dimensional object is created by shaping successive layers, which are adhered on top of each other to form the final object. 3D printing can be used with a variety of materials, including metals, polymers, ceramics, and others.

Other methods suitable for forming porous support structures suitable for use in electrode of the present invention are described, for example, in U.S. Patent Application Publication No. 2011/0076560, entitled "Electrochemical Cells Comprising Porous Structures Comprising Sulfur" to Scordilis-Kelley, et al., which is incorporated herein by reference.

Electrode active material (e.g., particles, films, or other forms comprising electrode active material) may be deposited within the pores of the porous support structure via a variety of methods. In some embodiments, electrode active material can be added to a suspension of particles used to form the porous support structure prior to formation of the porous support structure. The suspension can subsequently be cast to form an electrode comprising a porous support structure formed from the particles, with electrode active material occupying at least a portion of the pores of the resulting structure. In some embodiments, electrode active material is deposited by suspending or dissolving a particle precursor (e.g., a precursor salt, elemental precursor material such as elemental sulfur, and the like) in a solvent and exposing the porous support structure to the suspension or solution (e.g., via dipping the porous support structure into the solvent, by spraying the solvent into the pores of the porous support structure, and the like). The particle precursor may subsequently form particles within the pores of the support structure. For example, in some cases, the precursor may form crystals within the pores of the support structure. Any suitable solvent or suspension medium may be used in conjunction with such a technique including aqueous liquids, non-aqueous liquids, and mixtures thereof. Examples of suitable solvents or suspension media include, but are not limited to, water, methanol, ethanol, isopropanol, propanol, butanol, tetrahydrofuran, dimethoxyethane, acetone, toluene, xylene, acetonitrile, cyclohexane, and mixtures thereof. Of course, other suitable solvents or suspension media can also be used as needed.

Electrode active material can also be deposited within the pores of the support structure, in some cases, by heating a material above its melting point or boiling point (optionally adjusting the surrounding pressure to, for example, aid in evaporation). The heated material may then be flowed or vaporized into the pores of the support material such that particulate deposits or other solids are formed. As a specific example, elemental sulfur powder can be positioned next to a porous support material and heated above the melting point of sulfur, such that the sulfur flows into the pores of the material (e.g., via sublimation, via liquid flow). The composite can then be cooled such that the sulfur deposits within the pores.

In some embodiments, electrode active material can be deposited within the pores of the support structure via electrochemical deposition, chemical vapor deposition, or physical vapor deposition. For example, metals such as aluminum, nickel, iron, titanium, and the like, can be electrochemically deposited within the pores of a porous support structure. Alternatively, such materials may be deposited, for example, using a physical vapor deposition technique such as, for example, electron beam deposition.

Another aspect of the invention relates to controlling the total pore volume of one (or both) electrodes within an energy storage device. It has been discovered, according to one aspect of the present invention, that fabricating electrodes with total pore volumes within certain preferred ranges can yield enhanced performance. In certain embodiments, the total pore volume of one (or both) electrodes within the energy storage device are slightly higher than the volume of the solid reaction product that is formed when the electrochemical reaction used to generate electricity from the energy storage device is run to substantial completion. The use of electrodes having total pore volumes within the desirable ranges described herein can be particularly useful in energy storage devices configured such that the first and second electrode active materials undergo a reaction to form a volume of solid reaction product during operation of the energy storage device (e.g., as in the case of lithium-sulfur electrochemical cells and various other solid by-product producing cells described herein). When the total pore volume of an electrode (or both electrodes) of the energy storage device lies within such a range, there is sufficient porosity within the electrochemical cell to both accommodate the formation of solid by-product and to allow the passage of electrolyte through the pores of the electrode and toward the electrode active material.

In certain embodiments the total pore volume of the first electrode is between about 100% and about 300% of the volume of the solid reaction product formed when the reaction has proceeded to substantial completion. One of ordinary skill in the art would be capable of determining the volume of solid reaction product that is formed when an electrochemical reaction has proceeded to substantial completion using theoretical calculations. Generally, the process would involve determining the amount of electrode active materials within each of the electrodes of the electrochemical cell, using the stoichiometry of the electrochemical reaction to determine which of the electrode active materials is present in excess and which is not, calculating the mass of solid by-product that would be formed upon complete consumption of the reaction limiting electrode active material, and calculating the volume of the solid by-product using the density of the solid by-product. Such amounts could also be determined experimentally, for example, by completely discharging the electrochemical cell, measuring the volume of the discharged electrode (e.g., by submerging the porous support structure in a liquid and measuring the displacement of the liquid), removing the by-products from the porous support structure, and measuring the volume of the remaining porous support structure (e.g., via liquid submersion).

The total pore volume of an electrode generally refers to the total volume occupied by the pores within the porous support structure of the electrode when the electrode is substantially free of electrode active material. One of ordinary skill in the art would be capable of determining the total pore volume of a given electrode by, for example, removing the electrode active material from the electrode (e.g., by fully discharging the electrode) and performing mercury intrusion porosimetry.

The porous support structures described herein may be configured to include pores with a cross-sectional size distribution chosen to enhance the performance of the energy storage device in which the porous support structure is used. In some cases, the porous support structure may comprise pores than are larger than sub-nanometer scale and single-nanometer scale pores, which can be too small to allow for the passage of electrolyte (e.g., liquid electrolyte) into the pores of the electrode due to, for example, capillary forces. In addition, in some cases, the pores may be smaller than millimeter-scale pores, which may be so large that they render the electrode mechanically unstable.

In some embodiments, the porous support structure can comprise a plurality of pores, wherein each pore of the plurality of pores has a pore volume, and the plurality of pores has a total pore volume defined by the sum of each of the individual pore volumes. In some embodiments, at least about 50%, at least about 70%, at least about 80%, at least about 90%, at least about 95%, at least about 99%, or substantially all of the total pore volume is occupied by pores having cross-sectional diameters of between about 0.1 microns and about 10 microns. In some embodiments, at least about 50%, at least about 70%, at least about 80%, at least about 90%, at least about 95%, at least about 99%, or substantially all of the total pore volume is occupied by pores having cross-sectional diameters of between about 1 micron and about 10 microns, or between about 1 micron and about 3 microns. Stated another way, in some embodiments, the plurality of pores of the porous support structure together defines a total pore volume, and at least about 50% (or at least about 70%, at least about 80%, at least about 90%, at least about 95%, at least about 99%, or substantially all) of the total pore volume is defined by pores having cross-sectional diameters of between about 0.1 microns and about 10 microns (or between about 0.1 microns and about 20 microns, between about 1 micron and about 10 microns, or between about 1 micron and about 3 microns).

In some embodiments, it may be advantageous to use porous materials wherein the plurality of pores has an average cross-sectional diameter within a designated range. For example, in some cases, the porous support material may comprise a plurality of pores wherein the average cross-sectional diameter of the plurality of pores is between about 0.1 microns and about 10 microns, between about 1 micron and about 10 microns, or between about 1 micron and about 3 microns.

As described below, the pore distributions described herein can be achieved, in some cases, while an anisotropic force (e.g., defining a pressure of between about 4.9 Newtons/cm² and about 198 Newtons/cm², or any of the ranges outlined below) is applied to the electrochemical cell. This can be accomplished by fabricating the porous support structure from materials capable of maintaining their porosities under applied loads. Fabricating an electrode from a material which resists deformation under an applied load can allow the electrode to maintains its permeability under pressure, and allows the cathode to maintain the enhanced rate capabilities described herein. In some embodiments, the yield strength of the porous support structure (and the resulting electrode produced from the porous support structure) can be at least about 200 Newtons/cm², at least about 350 Newtons/cm², or at least about 500 Newtons/cm². Methods of fabricating such structures are described in more detail below.

As used herein, the "cross-sectional diameter" of a pore refers to a cross-sectional diameter as measured using ASTM Standard Test D4284-07. The cross-sectional diameter can refer to the minimum diameter of the cross-section of the pore. The "average cross-sectional diameter" of a plurality of pores refers to the number average of the cross-sectional diameters of each of the plurality of the pores. One of ordinary skill in the art would be capable of calculating the distribution of cross-sectional diameters and the average cross-sectional diameter of the pores within a porous structure using mercury intrusion porosimetry as described in ASTM standard D4284-07. For example, the methods described in ASTM standard D4284-07 can be used to produce a distribution of pore sizes plotted as the cumulative intruded pore volume as a function of pore diameter. To calculate the percentage of the total pore volume within the sample that is occupied by pores within a given range of pore diameters, one would: (1) calculate the area under the curve that spans the given range over the x-axis, (2) divide the area calculated in step (1) by the total area under the curve, and (3) multiply by 100%. Optionally, in cases where the article includes pore sizes that lie outside the range of pore sizes that can be accurately measured using ASTM standard D4284-07, porosimetry measurements may be supplemented using BET surface analysis, as described, for example, in S. Brunauer, P. H. Emmett, and E. Teller, *J. Am. Chem. Soc.*, 1938, 60, 309.

In some embodiments, the porous support structure may comprise pores with relatively uniform cross-sectional diameters. Not wishing to be bound by any theory, such uniformity may be useful in maintaining relatively consistent structural stability throughout the bulk of the porous support structure. In addition, the ability to control the pore size to within a relatively narrow range can allow one to incorporate a large number of pores that are large enough to allow for fluid penetration (e.g., electrolyte penetration) while maintaining sufficiently small pores to preserve structural stability of the porous support structure. In some embodiments, the distribution of the cross-sectional diameters of the pores within the porous support structure can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

The electrolyte can comprise any liquid, solid, or gel material capable of storing and transporting ions. In some embodiments, the electrolyte may comprise a non-solid electrolyte. The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes, for example, in lithium-based electrochemical cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic polysulfides (LiS$_x$R)$_n$, where x is an integer from 1 to 20, n is an integer from 1 to 3, and R is an organic group, and those disclosed in U.S. Pat. No. 5,538,812 to Lee et al.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

As noted elsewhere, the energy storage devices described herein are capable of achieving enhanced performance. For example, in certain embodiments, the energy storage devices described herein are capable of achieving relatively high utilization. "Utilization" refers to the extent to which the electrode active material (e.g., sulfur as a cathode active material in the case of a lithium-sulfur electrochemical cell) within a cell reacts to form desirable reaction products, such that the electrochemical performance (as measured by the discharge capacity) is enhanced. For example, an electrochemical cell is said to utilize 100% of the total sulfur in the cell when all of the sulfur in the cell is completely converted to the desired reaction product (e.g., $S^{2-}$ in the case of sulfur as the active cathode material), thus providing the theoretical discharge capacity of 1675 mAh/g of total sulfur in the cell. In certain embodiments, the energy storage devices are capable of utilizing, during charge and discharge, a relatively high percentage of electrode active material contained within the pores of a porous electrode. In some embodiments, the energy storage device is capable of utilizing at least about 90%, at least about 95%, or at least about 99% of the total electrode active material contained within the pores of a porous electrode through at least 100 charge and discharge cycles subsequent to a first charge and discharge cycle. As used herein, a "charge and discharge cycle" refers to the process by which a cell is charged from a 0% to a 100% state of charge (SOC) and discharged from a 100% back to a 0% SOC. As one particular example, in certain embodiments in which the energy storage device comprises an electrode comprising sulfur as an electrode active material, the device may be capable of utilizing at least about 90%, at least about 95%, or at least about 99% of the total sulfur in the energy storage device through at least 100 charge and discharge cycles subsequent to a first charge and discharge cycle, wherein 100% utilization corresponds to 1675 mAh per gram of total sulfur in the energy storage device.

In certain embodiments, the levels of utilization outlined in the preceding paragraph can be achieved when the electrode has a percentage porosity of less than about 45%, less than about 30%, or less than about 20%. The percentage porosity of an electrode (e.g., the cathode) is generally determined by dividing the void volume of the electrode by the volume within the outer boundary of the electrode, expressed as a percentage. "Void volume" is used to refer to portions of an electrode that are not occupied by electrode active material (e.g., sulfur) and materials within the porous support structure (e.g., conductive material, binder, etc.). Void volume may be occupied by electrolyte, gases, or other non-electrode materials.

In some embodiments, the levels of utilization outlined herein can be achieved while the electrode has an electrode active material loading of up to 4.0 mg/cm$^2$ or up to 5.5 mg/cm$^2$. The electrode active material loading level is determined by measuring the mass of the electrode active material within the electrode and dividing by the area of the surface of the electrode facing the opposite electrode within the electrochemical cell. For example, in the case of a relatively flat cathode arranged in a stacked configuration with an anode (e.g., as illustrated in FIG. 1, assuming 102 corresponds to the cathode and 104 corresponds to the anode), the electrode active material loading level is determined by dividing the mass of the electrode active material within the cathode by the area of the surface of the cathode facing the anode (e.g., the area of surface 110 in FIG. 1). In this context, a "surface of an electrode" refers to the geometric surface of the electrode, which will be understood by those of ordinary skill in the art to refer to the surface defining the outer boundaries of the electrode, for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.).

Some embodiments may include electrochemical devices in which the application of an anisotropic force is used to enhance the performance of the device. Application of force to the electrochemical cell may reduce the amount of roughening of one or more surfaces of one or more electrodes, which may improve the cycling lifetime and performance of the cell. Any of the electrode properties (e.g., porosities, pore size distributions, etc.) and/or performance metrics outlined above may be achieved, alone or in combination with each other, while an anisotropic force is applied to the electrochemical cell (e.g., during charge and/or discharge of the cell). The magnitude of the anisotropic force may lie within any of the ranges mentioned below.

In some embodiments, the anisotropic force applied to the energy storage device comprises a component normal to the active surface of an electrode of the energy storage device (e.g., the anode of a lithium-sulfur electrochemical cell). In the case of a planar surface, the force may comprise an anisotropic force with a component normal to the surface at the point at which the force is applied. For example, referring to FIG. 1, a force may be applied in the direction of arrow 150. Arrow 151 illustrates the component of the force that is normal to active surface 110 of electrode 102. In the case of a curved surface, for example, a concave surface or a convex surface, the force may comprise an anisotropic force with a component normal to a plane that is tangent to the curved surface at the point at which the force is applied.

In some embodiments, an anisotropic force with a component normal to the active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over the active surface of one or both electrodes. In some embodiments, the anisotropic force is applied uniformly over the active surface of an electrode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an electrode, is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

In some embodiments, an anisotropic force with a component normal to the active surface of an electrode (e.g., an anode such as a lithium-containing anode) is applied, during at least one period of time during charge and/or discharge of the energy storage device, to an extent effective to inhibit an increase in surface area of the electrode active surface relative to an increase in surface area absent the anisotropic force. The component of the anisotropic force normal to the anode active surface may, for example, define a pressure of at least about 5, at least about 10, at least about 25, at least about 50, at least about 75, at least about 100, at least about 120, at least about 150, at least about 175, at least about 200, at least about 225, or at least about 250 Newtons per square centimeter. In some embodiments, the component of the anisotropic force normal to the anode active surface may, for example, define a pressure of less than about 250, less than about 225, less than about 200, less than about 150, less than about 120, less than about 100, less than about 50, less than about 25, or less than about 10 Newtons per square centimeter. In some cases, the component of the anisotropic force normal to the anode active surface is may define a pressure of between about 5 and about 150 Newtons per square centimeter, between about 50 and about 120 Newtons per square centimeter, between about 70 and about 100 Newtons per square centimeter, between about 80 and about 110 Newtons per square centimeter, between about 5 and about 250 Newtons per square centimeter, between about 50 and about 250 Newtons per square centimeter, between about 80 and about 250 Newtons per square centimeter, between about 90 and about 250 Newtons per square centimeter, or between about 100 and about 250 Newtons per square centimeter. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force ($kg_f$) is equivalent to about 9.8 Newtons.

The anisotropic forces described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Patent Application Publication No. 2010/0035128, filed Aug. 4, 2009, entitled "Application of Force in Electrochemical Cells" to Scordilis-Kelley et al. which is incorporated herein by reference in their entirety.

The electrodes and energy storage devices described herein can be used for a wide variety of devices, such as, for example, electric vehicles, load-leveling devices (e.g., for solar- or wind-based energy platforms), portable electronic devices, and the like.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007/0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010/0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009/0200986, and entitled "Protective Circuit for Energy-Storage Device"; U.S. patent application Ser. No. 11/400,025, filed Apr. 6, 2006, published as U.S. Pub. No. 2007/0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006/0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008/0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, published as U.S. Pub. No. 2010/0239914, and entitled "Cathode for Lithium Battery"; U.S. patent application Ser. No. 12/471,095, filed May 22, 2009, 2010/0294049 and entitled "Hermetic Sample Holder and Method for Performing Microanalysis Under Controlled Atmosphere Environment"; U.S. patent application Ser. No. 12/862,513, filed on Aug. 24, 2010, published as U.S. Pub. No. 2011/0068001 and entitled "Release System for Electrochemical cells"; U.S. patent application Ser. No. 13/216,559, filed on Aug. 24, 2011, published as U.S. Pub. No. 2012/0048729 and entitled "Electrically Non-Conductive Materials for Electrochemical Cells;" U.S. patent application Ser. No. 12/862,528, filed on Aug. 24, 2010, published as U.S. Pub. No. 2011/0177398, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur"; U.S. patent application Ser. No. 12/862,551, filed on Aug. 24, 2010, published as U.S. Pub. No. 2011/0070491, entitled "Electrochemical Cells Comprising Porous Structures Comprising Sulfur"; U.S. patent application Ser. No. 12/862,576, filed on Aug. 24, 2010, published as U.S. Pub. No. 2011/0059361, entitled "Electrochemical Cells Comprising Porous Structures Comprising Sulfur"; U.S. patent application Ser. No. 12/862,581, filed on Aug. 24, 2010, published as U.S. Pub. No. 2011/0076560, entitled "Electrochemical Cells Comprising Porous Structures Comprising Sulfur"; U.S. patent application Ser. No. 13/240,113, filed on Sep. 22, 2011, published as U.S. Pub. No. 2012/0070746, and entitled "Low Electrolyte Electrochemical Cells"; and U.S. patent application Ser. No. 13/033,419, filed Feb. 23, 2011, published as U.S. Pub. No. 2011/0206992 and entitled "Porous Structures for Energy Storage Devices". All other patents and patent applications disclosed herein are also incorporated by reference in their entirety for all purposes.

The following examples are intended to illustrate certain embodiments of the present invention, but do not exemplify the full scope of the invention.

EXAMPLE 1

This example describes the fabrication and testing of an electrochemical cell having a cathode comprising a porous matrix fabricated using carbons formed from corn starch and phloroglucinol. Corn starch and phloroglucinol (50/50, by weight) were heated for 6 hours at 350° C. under vacuum (−64 cm of Hg gauge pressure), for 6 hours at 370° C. under the same vacuum, and subsequently for 5 hours at 600° C. under a reducing atmosphere of 5% hydrogen and 95% argon, by volume. The carbon thus prepared was dry ground to form carbon particles. The carbon particles were mixed with a polyvinyl alcohol (PVOH) binder at a weight ratio of 99:1, carbon:PVOH. The mixture was then applied to a PVOH-coated 2 mil thick polyethylene terephthalate (PET) substrate. The electronic conductivity of the applied carbon matrix was measured to be 0.15 mS/cm using a four point conductivity measurement.

Next, a cathode slurry was made by mixing 55 wt % elemental sulfur, 42.5 wt % carbon (prepared as described above), and 2.5 wt % PVOH. The slurry was coated on aluminum foil primed with conductive carbon layer. The foil was then dried to make the cathode. The active material (ACM) loading in the cathode was determined to be 5.45 mg/cm$^2$.

An electrochemical cell was fabricated using a cathode fabricated as described above. Lithium metal was used as the anode, separated from the cathode using a Celgard 2325 separator. The active area of the cathode in the electrochemical cell was 16.57 cm$^2$. 0.8 mL of an electrolyte with the following composition was added to the cell: 46.5 wt % dioxalane (DOL), 46.5 wt % di-methoxy ethane (DME), 8 wt % lithium bis (trifluoromethyl sulfonyl) imide, 2 wt % LiNO$_3$, and 1 wt % Guanidine nitrate. The ionic conductivity of the electrolyte was measured to be 6.1 mS/cm.

Figure 3A:
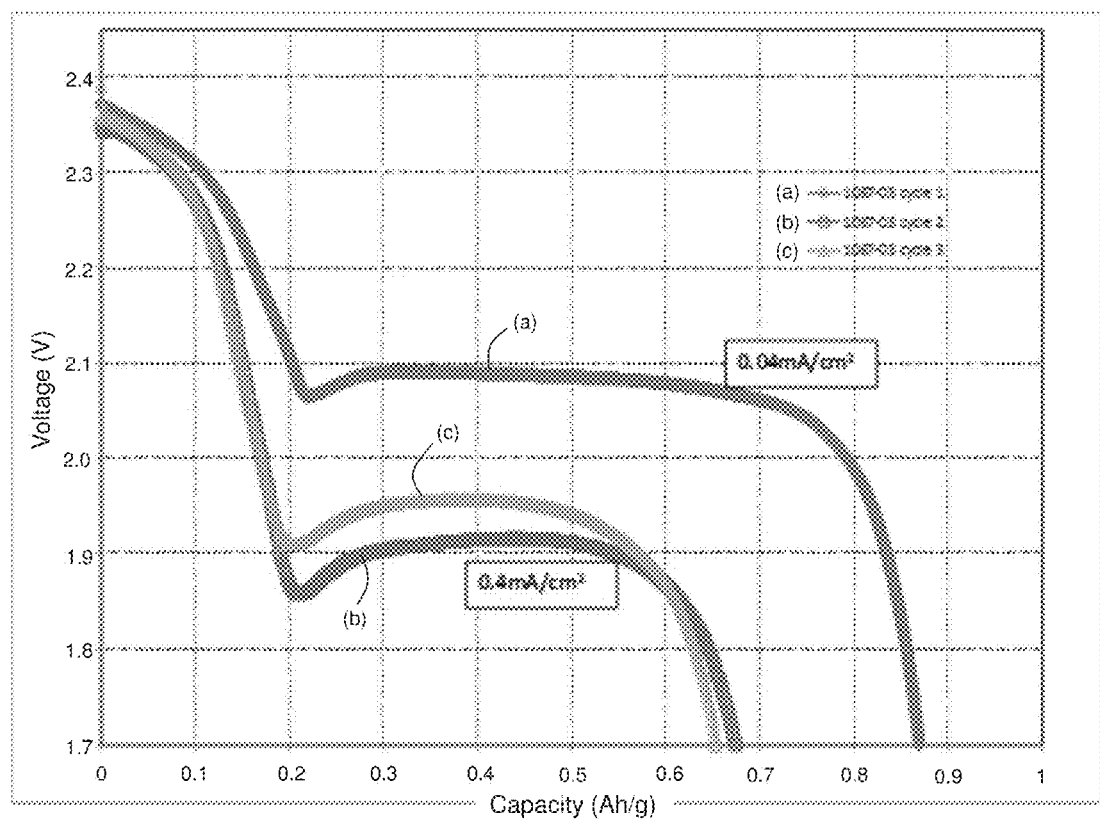
FIG. 3A is an exemplary plot of voltage as a function of capacity, according to certain embodiments.

FIG. 3A is a plot of the discharge profile of the electrochemical cell over the first three charge/discharge cycles. For the first charge/discharge cycle, a discharge current of 0.04 mA/cm$^2$ was used. For the second and third cycles, discharge and charge currents of 0.4 mA/cm$^2$ and 0.236 mA/cm$^2$, respectively, were used. As illustrated in FIG. 3A, even at the relatively high active material loading used in this electrochemical cell, the electrochemical cell was able to deliver 690 mAh/g of specific discharge capacity at a discharge rate of 0.4 mA/cm$^2$. This level of utilization was much higher than that observed in other electrochemical cells in which electrodes containing carbons (e.g., carbon black) with higher electronic conductivities (e.g., electronic conductivities of 1500 mS/cm and higher) were employed, which typically delivered utilizations of about 300 mAh/g at similar levels of electrode active material loading. It is expected that even higher specific discharge capacities (including specific discharge capacities of greater than 1500 mAh/g, greater than 1550 mAh/g, greater than 1600 mAh/g, and higher) can be achieved by increasing the total void volume of the cathode.

EXAMPLE 2

This example describes the fabrication and testing of an electrochemical cell having a cathode comprising a porous matrix fabricated using carbons formed from fructose. Fructose was heated for 6 hours at 350° C. under vacuum (−64 cm of Hg gauge pressure), for 6 hours at 370° C. under the same vacuum, and subsequently for 5 hours at 600° C. under a reducing atmosphere of 5% hydrogen and 95% argon, by volume. The carbon thus prepared was dry ground to form carbon particles.

Carbon particles prepared as described above were used to make a cathode. The cathode slurry was made using 55 wt % elemental sulfur, 42.5 wt % carbon (prepared as described above), and 2.5% PVOH. The slurry was coated on aluminum foil primed with a conductive carbon layer. The foil was then dried to make the cathode. The active material (ACM) loading in the cathode was 3.45 mg/cm$^2$.

One set of cathode/cathode symmetrical cells without liquid electrolyte were assembled using cathodes fabricated as described above. Care was taken to make sure that only the coated area of the two cathodes were in contact. The electronic conductivity of these cathodes were 0.0237 mS/cm, as measured by assembling symmetric cathode/cathode electrochemical cells and performing electronic impedance spectroscopy.

An electrochemical cell was made using a cathode fabricated as described above, a Celgard 2325 separator, and a lithium metal anode. The active area of the cathode in the cell was 16.57 cm$^2$. 0.8 mL of an electrolyte with the following composition was added to the cell: 46.5 wt % dioxalane (DOL), 46.5 wt % di-methoxy ethane (DME), 8 wt % lithium bis(trifluoromethyl sulfonyl) imide, 2 wt % LiNO$_3$, and 1 wt % Guanidine nitrate. The electrolyte had an ionic conductivity of 6.1 mS/cm.

Figure 3B:
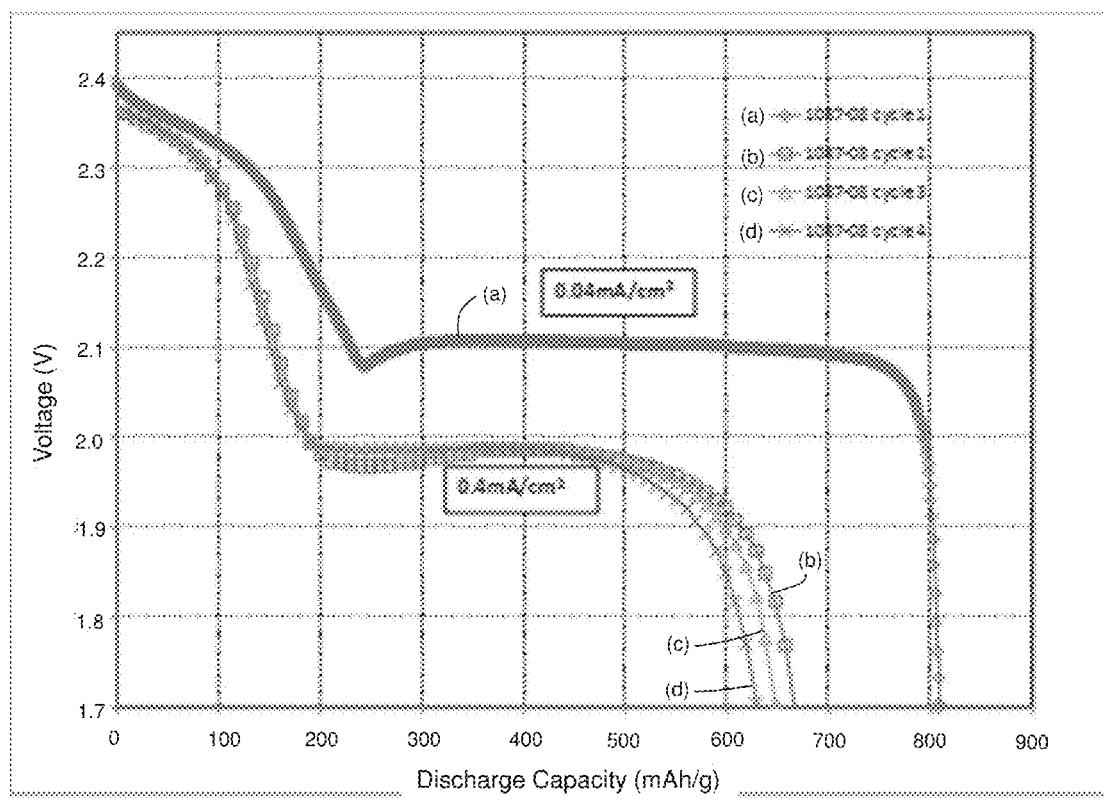
FIG. 3B is an exemplary plot, according to some embodiments, of voltage as a function of discharge capacity.

The electrochemical cell was subject to cycling tests, the results of which are shown in FIG. 3B. For the first charge/discharge cycle, a discharge current of 0.04 mA/cm$^2$ was used. For the second and third cycles, discharge currents of 0.4 mA/cm$^2$ and 0.236 mA/cm$^2$, respectively, were used. As illustrated in FIG. 3B, even at the relatively high active material loading used in this electrochemical cell, the electrochemical cell was able to deliver 666 mAh/g of specific discharge capacity at a discharge rate of 0.4 mA/cm$^2$. This level of utilization was much higher than that observed in other electrochemical cells in which electrodes containing carbons (e.g., carbon black) with higher electronic conductivities (e.g., electronic conductivities of 1500 mS/cm and higher) were employed, which typically delivered utilizations of about 300 mAh/g at similar levels of electrode active material loading. It is expected that even higher specific discharge capacities (including specific discharge capacities of greater than 1500 mAh/g, greater than 1550 mAh/g, greater than 1600 mAh/g, and higher) can be achieved by increasing the total pore volume of the cathode.

A provisional application entitled "Passivation of Electrodes in Electrochemical Cells," by Kumaresan et al., filed on Jan. 8, 2013, is incorporated herein by reference in its entirety.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An energy storage device, comprising:
   a first electrode comprising a first electrode active material and a total pore volume;
   an electrolyte; and
   a second electrode comprising a second electrode active material, wherein:
   the energy storage device is configured such that the first and second electrode active materials undergo a reaction to generate electricity, the reaction forming a volume of solid reaction product during operation of the energy storage device, and
   the total pore volume of the first electrode is between about 100% and about 300% of the volume of the solid reaction product formed when the reaction used to generate the electricity has proceeded to substantial completion.

2. The energy storage device of claim 1, wherein:
   the first electrode has a first electrode electronic conductivity;
   the electrolyte has an ionic conductivity; and
   the first electrode electronic conductivity is less than or equal to about 50% of the ionic conductivity of the electrolyte.

3. The energy storage device of claim 2, wherein the second electrode has a second electrode electronic conductivity, and the second electrode electronic conductivity is less than or equal to about 50% of the ionic conductivity of the electrolyte.

4. The energy storage device of claim 3, wherein the second electrode electronic conductivity is from about 1% to about 50% of the ionic conductivity of the electrolyte.

5. The energy storage device of claim 1, wherein the first electrode is a cathode, and the second electrode is an anode.

6. The energy storage device of claim 5, wherein the first electrode active material comprises sulfur.

7. The energy storage device of claim 6, wherein the device is capable of utilizing at least about 90% of the total sulfur in the energy storage device through at least 100 charge and discharge cycles subsequent to a first charge and discharge cycle, wherein 100% utilization corresponds to 1675 mAh per gram of total sulfur in the energy storage device.

8. The energy storage device of claim 6, wherein the sulfur comprises elemental sulfur.

9. The energy storage device of claim 5, wherein the second electrode active material comprises lithium.

10. The energy storage device of claim 9, wherein the lithium comprises lithium metal.

11. The energy storage device of claim 1, wherein the first electrode is an anode, and the second electrode is a cathode.

12. The energy storage device of claim 1, wherein the first electrode has an electrode electronic conductivity that is less than or equal to about 700 mS/cm.

13. The energy storage device of claim 1, wherein the first electrode comprises a porous support structure comprising a plurality of pores, and the first electrode active material is at least partially disposed within the pores of the porous support structure.

14. The energy storage device of claim 13, wherein each pore of the plurality of pores has a pore volume, and the plurality of pores has a total pore volume defined by the sum of each of the individual pore volumes, and at least about 50% of the total pore volume is occupied by pores having cross-sectional diameters of between about 0.1 microns and about 10 microns.

15. The energy storage device of claim 13, wherein at least a portion of the porous support structure is made of at least one of carbon, a metal carbide, a metal nitride, silicon, and a polymer.

16. The energy storage device of claim 1, wherein the energy storage device is a zinc-air electrochemical cell.

17. The energy storage device of claim 1, wherein the energy storage device is an aluminum-air electrochemical cell.

18. The energy storage device of claim 1, wherein the energy storage device is a lithium-air electrochemical cell.

19. The energy storage device of claim 1, wherein the energy storage device is a lithium-sulfur dioxide electrochemical cell.

20. The energy storage device of claim 1, wherein the energy storage device is a lithium-thionyl chloride electrochemical cell.

21. The energy storage device of claim 1, wherein the energy storage device is a lithium-sulfuryl chloride electrochemical cell.

* * * * *